US008635090B2

(12) United States Patent
Virdhagriswaran et al.

(10) Patent No.: US 8,635,090 B2
(45) Date of Patent: Jan. 21, 2014

(54) SYSTEMS AND METHODS FOR PROVIDING COVERAGE RECOMMENDATION ENGINE

(75) Inventors: Sankar Virdhagriswaran, Boxborough, MA (US); Julia M. Feldman, West Hartford, CT (US); Matthew J. Pietrusewicz, Southington, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 580 days.

(21) Appl. No.: 12/470,162

(22) Filed: May 21, 2009

(65) Prior Publication Data

US 2010/0274594 A1    Oct. 28, 2010

Related U.S. Application Data

(60) Provisional application No. 61/173,249, filed on Apr. 28, 2009.

(51) Int. Cl.
*G06Q 40/00*   (2012.01)

(52) U.S. Cl.
USPC ............................................................. 705/4

(58) Field of Classification Search
None
See application file for complete search history.

(56) References Cited

U.S. PATENT DOCUMENTS

| | | | |
|---|---|---|---|
| 7,490,050 B2 | 2/2009 | Grover et al. | |
| 7,814,548 B2* | 10/2010 | Mukhopadhyay et al. | 726/24 |
| 2002/0116231 A1* | 8/2002 | Hele et al. | 705/4 |
| 2006/0085230 A1* | 4/2006 | Brill et al. | 705/4 |
| 2006/0212337 A1* | 9/2006 | Vayghan et al. | 705/10 |
| 2006/0265258 A1* | 11/2006 | Powell et al. | 705/7 |
| 2007/0043662 A1* | 2/2007 | Lancaster | 705/38 |
| 2008/0021649 A1* | 1/2008 | Choy et al. | 702/1 |
| 2009/0030986 A1* | 1/2009 | Bates | 709/205 |
| 2009/0192827 A1* | 7/2009 | Andersen et al. | 705/4 |
| 2009/0254379 A1* | 10/2009 | Adams et al. | 705/4 |
| 2010/0223078 A1* | 9/2010 | Willis et al. | 705/4 |

OTHER PUBLICATIONS

Brewer at al.; Interest Rate Risk and Equity Values of Life Insurance Companies: A GARCH-M Model; The Journal of Risk and Insurance; vol. 74, No. 2, pp. 401-423; (Jun. 2007).*

(Continued)

*Primary Examiner* — Virpi Kanervo
(74) *Attorney, Agent, or Firm* — Howard IP Law Group, PC

(57) ABSTRACT

A computer system includes a data storage device. The data storage module receives, stores, and provides access to historical entity data and insurance coverage package data. A recommendation engine comprising program instructions stored in a program memory receives current entity data, creates a current entity representative record based on the received current entity data and historical entity data, creates one or more historical entity representative records for each of a plurality of insurance coverage packages, identifies one of the historical entity representative records based on the current entity representative record, identifies one or more of the plurality of insurance coverage packages based on the identified historical entity representative record, and presents the identified one or more insurance coverage packages when executed by a computer processor. A payment device processes a payment associated with one of the identified one or more insurance coverage packages to establish an insurance contract with the current entity based on the one of the identified one or more insurance coverage packages.

24 Claims, 16 Drawing Sheets

(56) References Cited

OTHER PUBLICATIONS

Fildes et al.; Forecasting and Operational Research: A Review; The Journal of Operational Research Society; vol. 59, No. 9, pp. 1150-1172; (Sep. 2008).*

Pearson, Robin; Towards an Historical Model of Services Innovation: The Case of Insurance Industry. 1700-1914; The Economic History Review, New Series; vol. 50, No. 2, pp. 235-256; (May 1997).*

Tian Zhan et al., "BIRCH: An Efficient Data Clustering Method for Very Large Databases", SIGMOD Jun. 1996, Montreal, Canada, pp. 103-105 (3pgs total).

Bill Andreopoulos et al., "Clustering Mixed Numerical and Low Quality Categorical Data: Significance Metrics on a Yeast Example", Department of Computer, IQIS 2005, Jun. 17, 2005, Baltimore, MD, pp. 87-98 (12pgs total).

* cited by examiner

| Insurance Line | Business Type | SIC codes | Locations | Employees | Revenue | Issue rate / SIC code | Threat | Appetite |
|---|---|---|---|---|---|---|---|---|
| Property | Contractor | 1731 | Chicago, IL | 152 | $3,293,443 | .78 | 67.3 | T, L |

FIG. 6

| Insurance Line | Business Type | SIC codes | Locations | Employees | Revenue | Issue rate / SIC code | Threat | Appetite |
|---|---|---|---|---|---|---|---|---|
| Property | Contractor | 1799 | | 175 | $2,855,500 | .82 | 65.4 | T, L |

*FIG. 8*

| Coverage Code String | Insurance Line | Business Type | SIC codes | Revenue | Issue rate / SIC code | |
|---|---|---|---|---|---|---|
| 0071 – 0134 – 0180 | Property | Contractor | 1799 | $1,585,252 | .94 | |
| 0071 – 0134 – 0180 | Property | Contractor | 1731 | $2,455,500 | .82 | 1110 |
| 0071 – 0134 – 0180 | Property | Software | 1645 | $2,845,500 | .82 | |
| 0071 – 0086 – 0169 – 0180 | Property | Contractor | 1741 | $5,666,655 | .43 | |
| 0071 – 0086 – 0169 – 0180 | Property | Contractor | 1731 | $855,500 | .82 | 1120 |
| 0071 – 0086 – 0169 – 0180 | Property | Software | 1645 | $22,455,600 | .95 | |
| 0071 – 0086 – 0169 – 0180 | Property | Contractor | 1731 | $365,500 | .52 | |
| 0071 – 0134 | Property | Contractor | 1799 | $125,000 | .82 | |

| Set Size | Exp_Conf | Conf | Support | Lift | Count | Rule |
|---|---|---|---|---|---|---|
| 2 | 31.9 | 88.4 | 5.5 | 2.8 | 1,523 | 70→20 |
| 2 | 6.2 | 17.3 | 5.5 | 2.8 | 1,523 | 20→70 |
| 2 | 5.5 | 15.0 | 4.7 | 2.7 | 1,309 | 69→73 |
| 2 | 31.5 | 85.9 | 4.7 | 2.7 | 1,309 | 73→69 |
| 2 | 31.9 | 85.6 | 4.7 | 2.7 | 1,304 | 73→20 |
| 2 | 5.5 | 14.8 | 4.7 | 2.7 | 1,304 | 20→73 |
| 2 | 31.5 | 80.6 | 5.0 | 2.6 | 1,387 | 70→69 |
| 2 | 6.2 | 15.9 | 5.0 | 2.6 | 1,387 | 69→70 |
| 3 | 31.5 | 75.8 | 18.5 | 2.4 | 5,111 | 40&20→69 |
| 3 | 24.5 | 58.7 | 18.5 | 2.4 | 5,111 | 69→40&20 |
| 2 | 31.9 | 75.9 | 23.9 | 2.4 | 6,606 | 69→20 |
| 2 | 31.5 | 75.2 | 23.9 | 2.4 | 6,606 | 20→69 |
| 3 | 31.9 | 71.2 | 18.5 | 2.2 | 5,111 | 69&40→20 |
| 3 | 26.0 | 58.1 | 18.5 | 2.2 | 5,111 | 20→69&40 |

| Coverage | Code |
|---|---|
| BPP Without Wind Exclusion | 20 |
| Business Liability | 40 |
| Contractors Stretch | 69 |
| Contractors Equipment | 70 |
| Tool Floater | 73 |

Legend

SYSTEMS AND METHODS FOR PROVIDING COVERAGE RECOMMENDATION ENGINE

CROSS-REFERENCE TO RELATED APPLICATION

The present application claims priority to U.S. Provisional Patent Application Ser. No. 61/173,249, filed on Apr. 28, 2009 and entitled "Systems and Methods for Providing Coverage Recommendation Engine", the contents of which are incorporated herein by reference for all purposes.

FIELD

Embodiments relate to systems and methods to facilitate the selection of insurance coverages, and may provide insurance coverage recommendations based on current and historical entity data.

BACKGROUND

Insurance companies offer a great number of insurance coverages, particularly in the commercial sector. Consequently, it can be difficult for an insurance agent to determine appropriate insurance coverages, limits and deductibles for a particular commercial customer. This determination is significantly more difficult for a business owner, who is typically unfamiliar with available coverages and/or the extent of potential exposures. Further exacerbating these difficulties is the fact that some commercial insurance coverages are suited for use together, while others are incompatible with one another.

In some scenarios, a business owner compiles a significant amount of information describing the business or other entity to be insured. This information is provided to an agent, who might recommend a set of insurance coverages based on the information and on her professional experience. Aggregating and providing this information is particularly burdensome to a business owner, and the prospect thereof may discourage the business owner from requesting a recommendation. The typical lag time for receiving a requested recommendation may further disincentivize the business owner from requesting the recommendation. Moreover, the quality of the recommendation is limited by the professional experience of the agent.

Some conventional systems may attempt to electronically determine commercial insurance coverages for a business based on received information describing the business. These systems may operate based on a set of preconfigured rules (e.g., if revenue>$1M and business="General Contractor", then suggest Coverage Package A). Due to the vast number of possible insurance coverage combinations and the inherent inflexibility of generic preconfigured rules, these systems cannot be confidently relied upon to determine an appropriate set of commercial insurance coverages.

Systems and methods are desired to facilitate the recommendation of insurance coverages which are appropriate for a given entity. It is desirable for such a recommendation to be provided based on a small set of data associated with the entity. Also desired are prompt presentation of the recommendation, and/or determination of the recommendation based on significant quantities of historical data associated with other entities and insurance coverages.

SUMMARY

Some embodiments provide efficient recommendation of insurance coverages from among a multitude of insurance coverages (e.g., such as available commercial insurance coverages) based on a small set of data provided by an entity to be insured and on historical data associated with other entities and insurance coverages.

A computer system is disclosed which includes a data storage device. Functions performed by the data storage module include receiving, storing and providing access to historical entity data and insurance coverage package data. A computer processor may execute program instructions and retrieve the historical entity data and insurance coverage package data from the data storage device, while a memory, coupled to the computer processor, stores program instructions for execution by the computer processor.

A recommendation engine receives current entity data, creates a current entity representative record based on the received current entity data and historical entity data, creates one or more historical entity representative records for each of a plurality of insurance coverage packages, identifies one of the historical entity representative records based on the current entity representative record, and identifies one or more of the plurality of insurance coverage packages based on the identified historical entity representative record when executed by the computer processor.

The computer system also includes a communication device, coupled to the computer processor, to present the identified insurance coverage package, and a payment device to process a payment associated with one of the identified one or more insurance coverage packages, the payment to establish an insurance contract with the current entity based on the one of the identified one or more insurance coverage packages.

In some embodiments, the current entity representative record created based on the historical data does not necessarily describe the current entity, but provides an efficient link for matching the current entity with a set of insurance coverages from among a multitude of insurance coverages based on the historical data.

With these and other advantages and features that will become apparent, embodiments may be more clearly understood by reference to the following detailed description, the appended claims, and the drawings attached hereto.

BRIEF DESCRIPTION OF THE DRAWINGS

FIG. 6 is a tabular representation of a current entity data record according to some embodiments.

FIG. 8 is a tabular representation of a portion of current entity representative record according to some embodiments.

FIG. 11 is a tabular representation of data associating insurance coverage packages and one or more representative historical entities according to some embodiments.

FIG. 12 is a outward view of an interface to present insurance coverage packages according to some embodiments.

FIG. 14 is a outward view of an interface to present coverage configurations according to some embodiments.

FIG. 15 illustrates the determination of coverage recommendations according to some embodiments.

FIG. 16 is a outward view of an interface to present coverage recommendations according to some embodiments.

DETAILED DESCRIPTION

Figure 1:
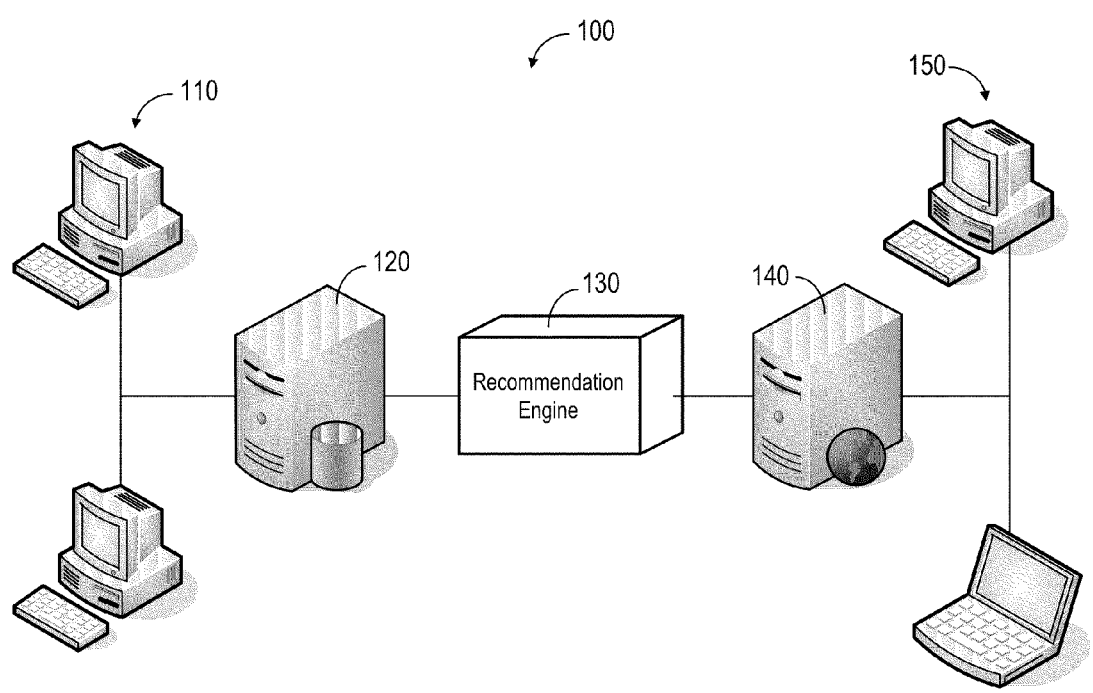
FIG. 1 illustrates a system architecture within which some embodiments may be implemented.

FIG. 1 illustrates system architecture 100 within which some embodiments may be implemented. Although the devices of architecture 100 are depicted as communicating via dedicated connections, it should be understood that all illustrated devices may communicate to one or more other illustrated devices through any number of other public and/or private networks, including but not limited to the Internet. Two or more of the illustrated devices may be located remote from one another and may communicate with one another via any known manner of network(s) and/or a dedicated connection. Moreover, each device may comprise any number of hardware and/or software elements suitable to provide the functions described herein as well as any other functions. Other topologies may be used in conjunction with other embodiments.

According to the example of FIG. 1, data entry terminals 110 comprise devices for providing data relating to entities and/or insurance coverage packages. An entity may comprise a business, an individual, and/or any physical or mental construct for which insurance coverage may be provided. Entity data may specify entity type, entity location, annual revenue, number of employees, and SIC code, but embodiments are not limited thereto.

An insurance coverage package may comprise a set of one or more insurance coverages. Each of the one or more insurance coverages may insure against one or more risks. In the present description, an insurance coverage defines the parameters of the risk(s) which are covered thereby, and a configuration is a package of one or more insurance coverages, including specified limits and deductibles for each of the one or more insurance coverages.

Data entry terminals 110 may be operated by an insurer, an insurance agent, a third party data provider, a consumer, or any other suitable source of data. Any number of data entry terminals 110 may be employed to receive entity data and insurance coverage package data according to some embodiments. The data may be generated and received using any systems that are or become known.

The entity data and insurance coverage package data are received and stored by data warehouse 120. Any number or type of data storage systems may store the data in any suitable manner according to some embodiments. Non-exhaustive examples include a relational database system, a spreadsheet, and any other data structure that is amenable to parsing. Data warehouse 120 may receive and store entity data and insurance coverage package data which were received from sources other than data entry terminals 110.

Recommendation engine 130 receives the entity data and insurance coverage package data from data warehouse 120. Recommendation engine 130 may identify one or more insurance coverage packages based on the received data and on data received from Web server 140.

In this regard, Web server 140 may receive entity data from requester terminals 150. Requestor terminals 150 may be operated by an insurance agent, a business owner, etc. seeking a recommendation of insurance coverages. Requestor terminals 150 may interact with Web pages provided by Web server 140 to request a recommendation and to provide data relating to the entity to be insured (hereinafter referred to as the "current" entity). This data may be transmitted to recommendation engine 130 to determine a recommendation as described in detail below.

Briefly, recommendation engine 130 may receive the current entity data (e.g., from Web server 140), create a current entity representative record based on the received current entity data and historical entity data (e.g., from data warehouse 120), create one or more historical entity representative records for each of a plurality of insurance coverage packages (e.g., received from data warehouse 120), identify one of the historical entity representative records based on the current entity representative record, and identify one or more of the plurality of insurance coverage packages based on the identified historical entity representative record. Web server 140 may provide a Web page which presents the identified insurance coverage package as a recommendation to one of requestor terminals 150.

Recommendation engine 130 may comprise any combination of hardware and/or processor-executable instructions stored on a tangible medium. According to some embodiments, recommendation engine 130 is a component of data warehouse 120 or data Web server 140.

It should be noted that embodiments are not limited to the devices illustrated in FIG. 1. Each device may include any number of disparate hardware and/or software elements, some of which may be located remotely from one another. Functions attributed to one device may be performed by one or more other devices in some embodiments. The devices of system 100 may communicate with one another (and with other non-illustrated elements) over any suitable communication media and protocols that are or become known.

Figure 2:
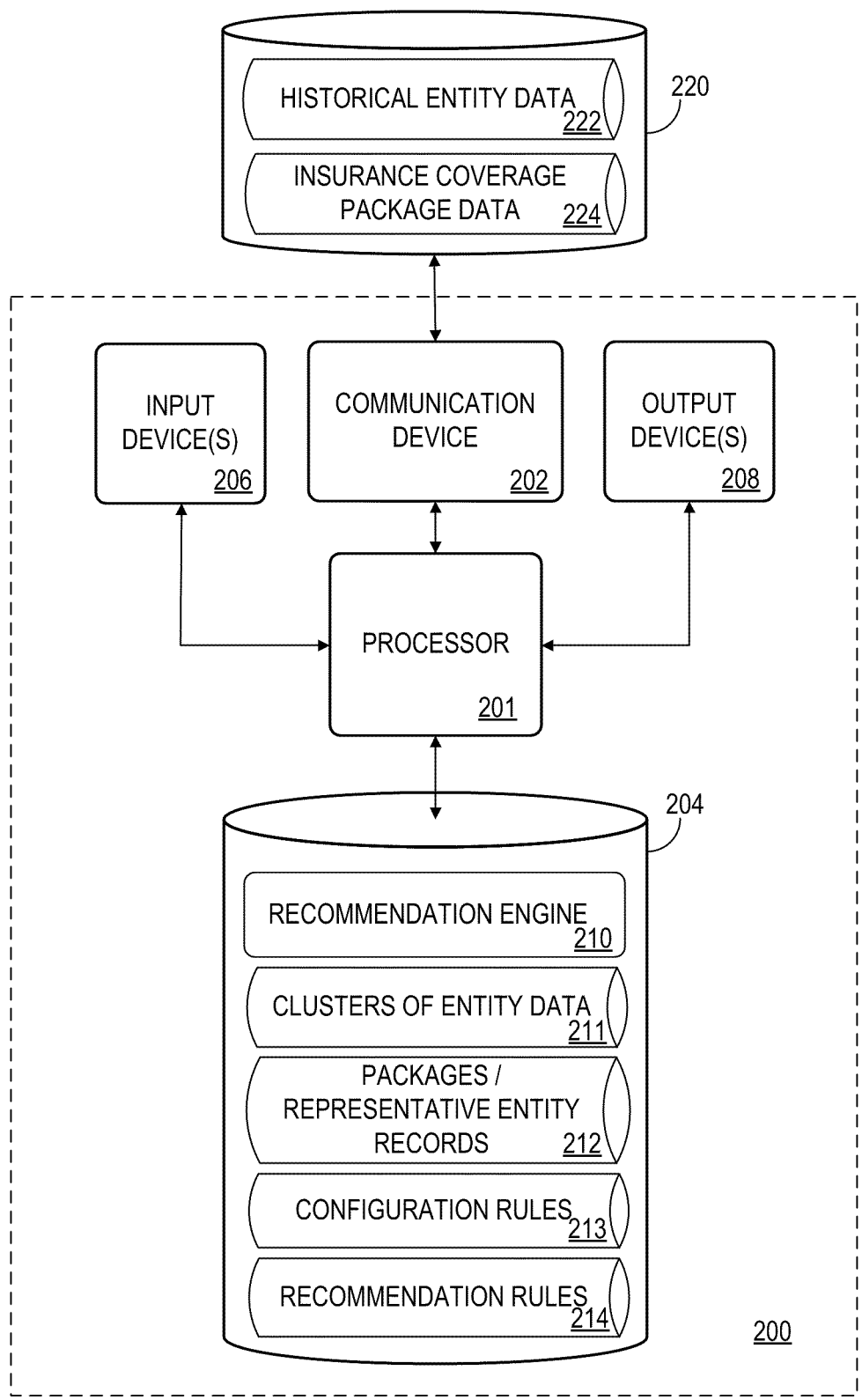
FIG. 2 is a partial functional block diagram of a computer system provided in accordance with some embodiments.

FIG. 2 is a block diagram of computer system 200 according to some embodiments. Computer system 200 may perform the functions attributed above to recommendation engine 130. Computer system 200 includes computer processor 201 operatively coupled to communication device 202, data storage device 204, one or more input devices 206 and one or more output devices 208. Communication device 202 may facilitate communication with external devices. Input device(s) 206 may comprise, for example, a keyboard, a keypad, a mouse or other pointing device, a microphone, knob or a switch, an infra-red (IR) port, a docking station, and/or a touch screen. Input device(s) 206 may be used, for example, to enter information into computer system 200. Output device(s) 208 may comprise, for example, a display (e.g., a display screen) a speaker, and/or a printer.

Data storage device 204 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Data storage device 204 stores program instructions for execution by processor 201. Recommendation engine 210 may comprise a set of such instructions, and may be executed by processor 201 to cause system 200 to operate as described above with respect to recommendation engine 130 of FIG. 1. This operation may initially include operation of communication device 202 to retrieve, from external data storage device 220, historical entity data 222 and insurance coverage package data 224. In some embodiments, and as described with respect to FIG. 1, data storage device 220 may comprise a data warehouse.

Data storage device 204 stores other data used and/or generated during operation according to some embodiments. This data includes clusters of entity data 211, packages and associated representative historical entity records 212, configuration rules 213 and recommendation rules 214. The nature and usage of this stored data according to some embodiments will be described in detail below.

Figure 3:
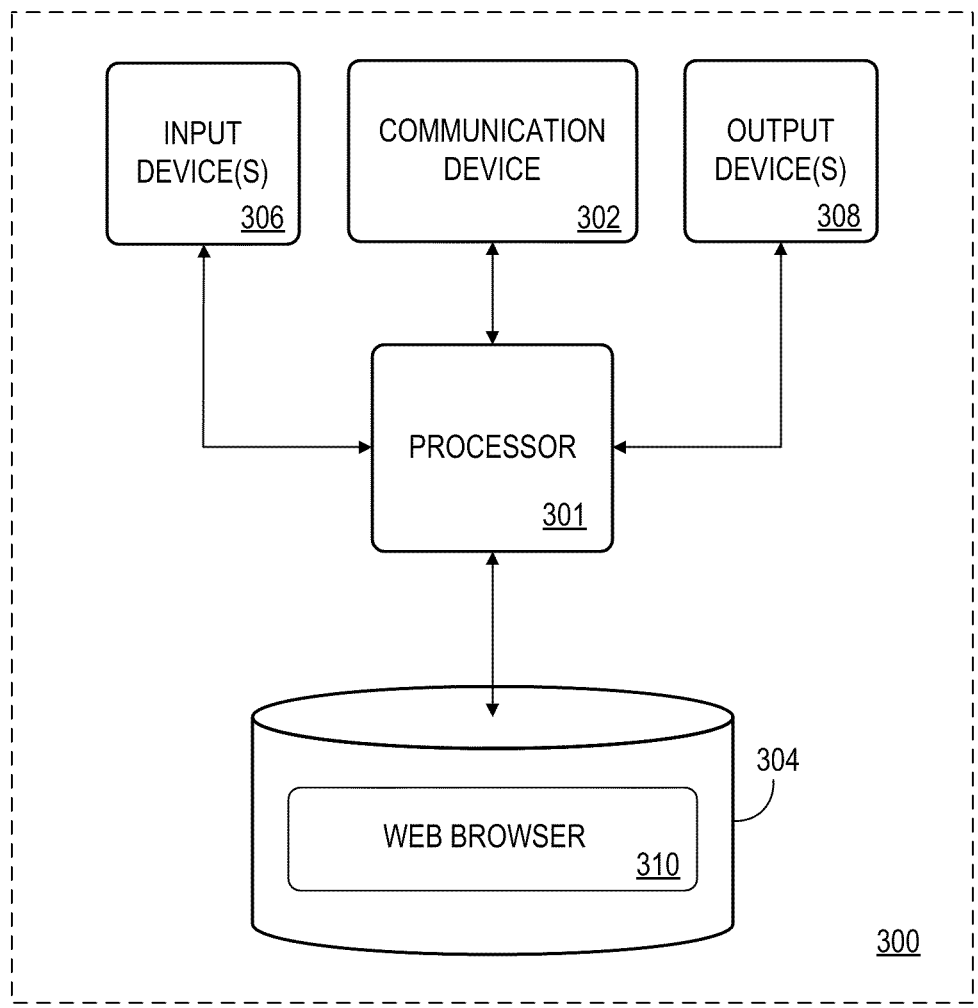
FIG. 3 is a partial functional block diagram of a computer system provided in accordance with some embodiments.

FIG. 3 is a block diagram of computer system 300 according to some embodiments. Computer system 300 may perform the functions attributed above to a requester terminal 150. Computer system 300 includes computer processor 301, which is operatively coupled to communication device 302, data storage device 304, one or more input devices 306 and one or more output devices 308. Communication device 302 may facilitate communication with external devices. Input device(s) 306 and output device(s) 308 may comprise any devices described above with respect to input device(s) 206 and output device(s) 208, but are not limited thereto.

Data storage device 304 may comprise any appropriate information storage device, including combinations of magnetic storage devices (e.g., magnetic tape and hard disk drives), optical storage devices, and/or semiconductor memory devices such as RAM devices and ROM devices.

Data storage device 304 stores program instructions for execution by processor 300, such as Web browser 310. Web browser 310 may be executed by processor 301 to cause system 300 to submit entity data via a Web page to Web server 140 and receive a Web page from Web server 140 presenting one or more insurance coverage packages. Data storage device 304 may also store other applications, device drivers and data files usable to provide additional functionality to computer system 300.

Figure 4:
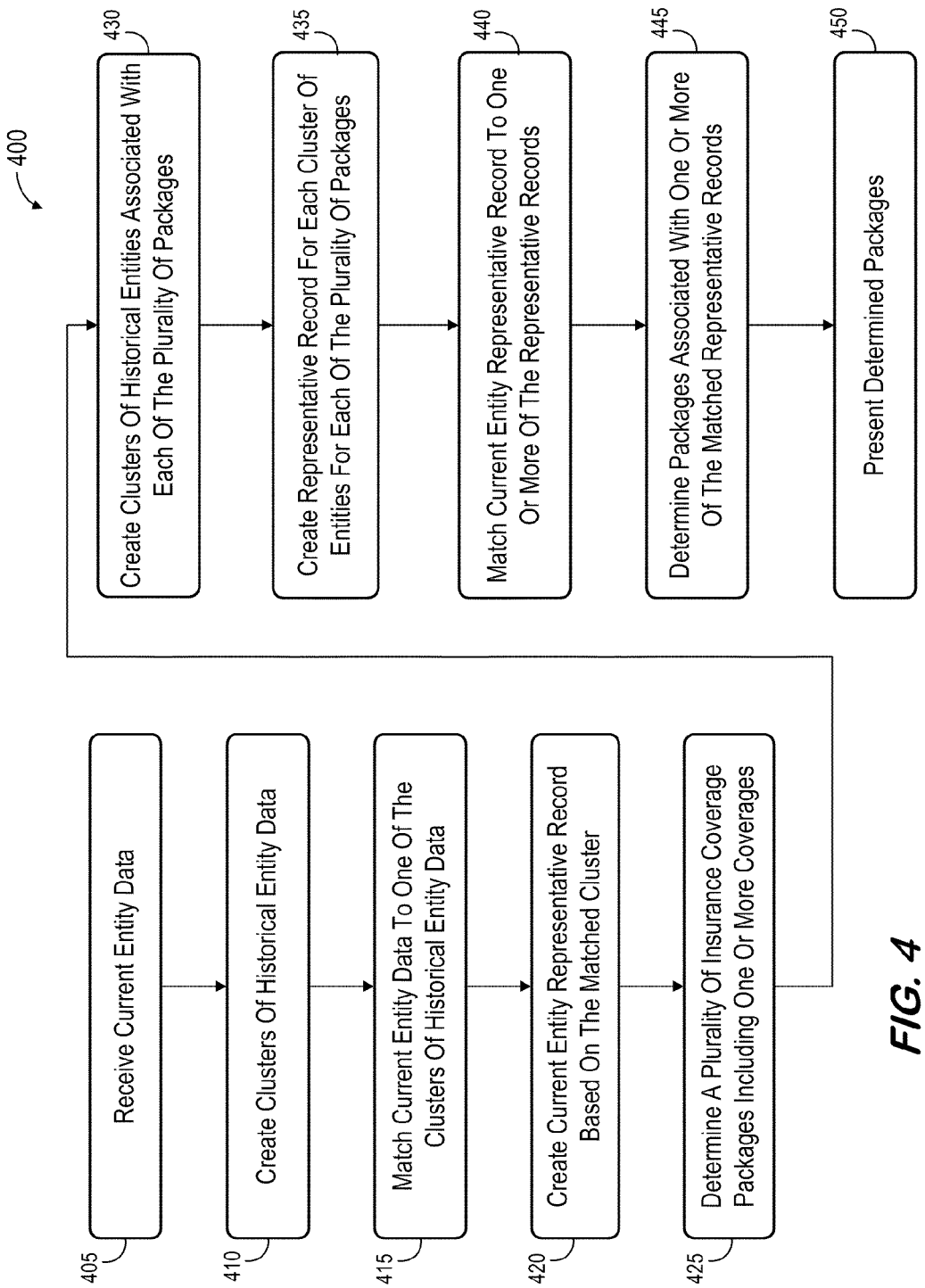
FIG. 4 is a flow diagram of a process according to some embodiments.

FIG. 4 is a flow diagram of process 400 according to some embodiments. Various elements of system architecture 100 and/or computer system 200 may execute process 400 according to some embodiments. Process 400 may be embodied within program instructions of recommendation engine 210 of computer system 200, but embodiments are not limited thereto.

Process 400 and all other processes mentioned herein may be embodied in processor-executable program instructions read from one or more computer-readable media, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program instructions for implementation of processes according to some embodiments. Embodiments are therefore not limited to any specific combination of hardware and software.

Initially, at 405, current entity data is received. The current entity data includes any data associated with an entity for which insurance coverage recommendations are desired. The current entity data may be received from the current entity, from third party sources (e.g., public records, Secretary of State databases), from proprietary data sources, and from any other suitable data sources.

The current entity data may include, but is not limited to, types of insurance coverages in which the current entity is interested (e.g., property, general liability, workers' compensation), entity type, address, zip code, annual revenue, number of employees, and SIC code. Some examples of current entity data which may be received from proprietary data sources include derived insurance company metrics such as issue rate per SIC codes, Catastrophic/Terrorism threat based on location, appetite (Target, Acceptable, Limited, Not Acceptable) based on SIC code and state, and business insurance scores indicating the desirability of the entity as an insurance customer.

Figure 5:
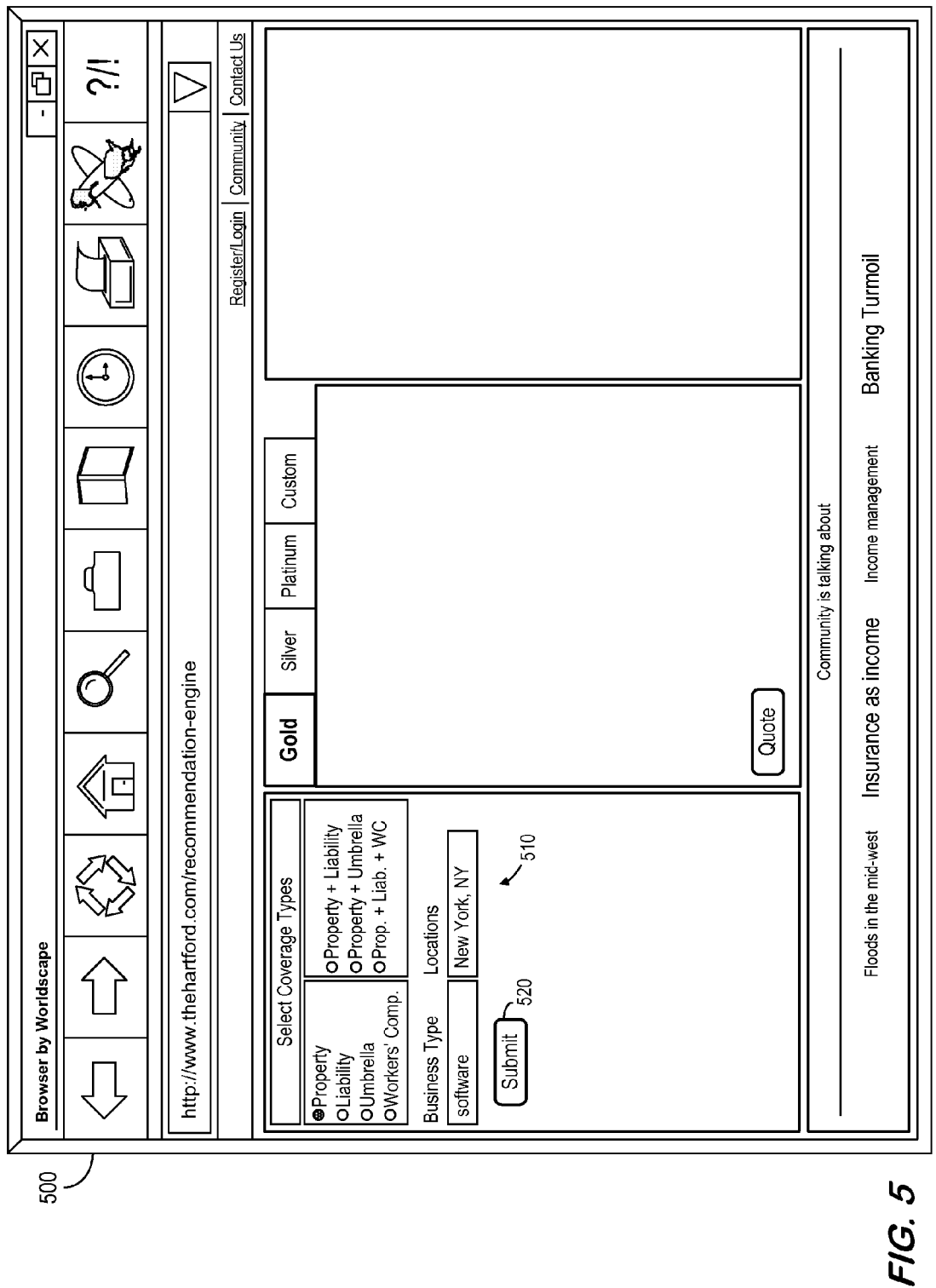
FIG. 5 is a outward view of an interface to receive current entity data according to some embodiments.

FIG. 5 is an outward view of interface 500 from which entity data may be received according to some embodiments of 405. In one example, a user operates one of requestor terminals 150 or computer system 300 to execute a Web browser. The user manipulates an interface of the Web browser to access a Web page of Web server 140 (or of computer system 200) presenting interface 500.

Interface 500 includes area 510 into which the user inputs data associated with the current entity. The current entity is an entity for which insurance recommendations are desired, and need not be affiliated with the user. As shown, area 510 allows the user to specify coverage type(s), business type and business location, and to submit the data for reception at 405 using Submit button 520. Coverage types are not limited to those shown in FIG. 5, and may also or alternatively include commercial auto, marine, professional liability, or any others that are or become known.

The data requested in area 510 may change depending upon the selected coverage type(s). For example, area 510 may include a field for annual revenue if liability coverage was selected, and/or a field for number of employees if workers' compensation coverage was selected.

Embodiments may allow for more, less and/or different current entity data to be specified in area 510. Some embodiments do not require the user to complete all data fields of area 510. It may be advantageous to limit an amount of current entity data requested by interface 500. Such limitations may simplify, and thereby encourage, usage of interface 500.

As mentioned above, the current entity data received at 405 may also include data retrieved from third parties and/or internally derived data. This data may be retrieved or derived based on the information received from the user via user interface 500.

FIG. 6 is a tabular representation of current entity data 600 received at 405 according to some embodiments. Data 600 includes user-entered data, data received from third parties and internally-derived data. In this regard, a data field (e.g., Revenue) may be populated with data received from the user via interface 500. However, if the user did not complete this data field of area 510 (or if area 510 did not include this field), this field may be populated with data retrieved from a third party. Embodiments are not limited to the fields shown in FIG. 6, and each data field need not be populated in some embodiments.

After reception of the current entity data, clusters of historical entity data are created at 410. In contrast to the flow of process 400, some embodiments may create the clusters prior to reception of the current entity data.

The historical entity data used at 410 may include previously-stored user-entered data, third party data, and internal data such as that described above. The historical entity data may be stored in data warehouse 120 as multiple records such as that illustrated in FIG. 6, with each record associated with a particular entity. Each field of each record need not be populated.

The historical entity data may have been previously acquired in any manner, including those described with respect to 405 above. For example, an entity may have entered a coverage type and business type during a prior insurance shopping experience, a corresponding SIC code or codes, number of locations, addresses, number of employees and annual revenue may have been fetched from a third party during the shopping experience, and internal data may have been derived based thereon.

The historical entity data may be clustered at 410 according to any clustering system that is or becomes known. In some embodiments, the data is clustered by a combination of the Balanced Iterative Reducing and Clustering using Hierarchies (BIRCH) algorithm (e.g., for metric values) and the M-BILCOM algorithm (e.g., for metric and categorical values).

Figure 7:
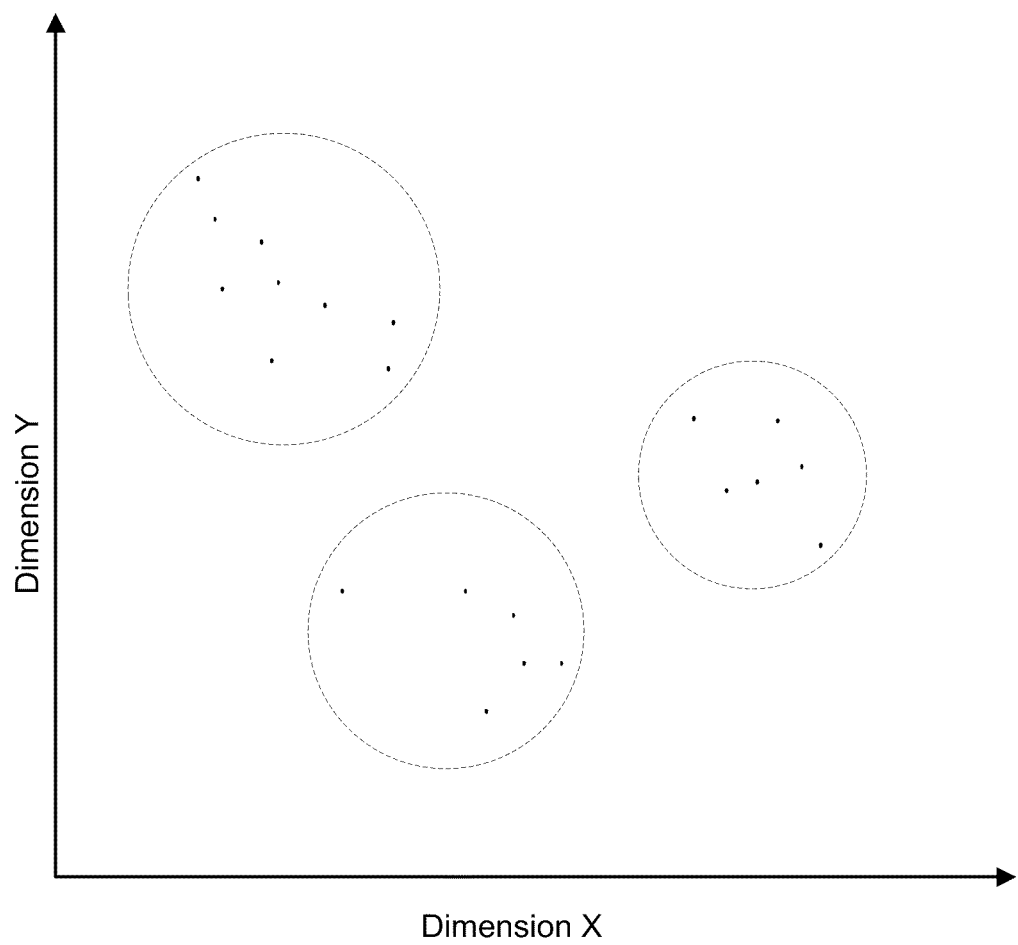
FIG. 7 is a simplified representation of clusters of historical entity data according to some embodiments.

FIG. 7 is a simplified representation of clusters of historical entity data records according to some embodiments. Specifically, the historical entity data records are clustered across many dimensions (e.g., one dimension per data field) but FIG. 7 shows only two dimensions. Each cluster (represented by a dashed circle) may be represented by it's weighted midpoint across all its dimensions (e.g., data fields).

Next, at 415, the current entity data is matched to one of the clusters of historical entity data created at 410. Any suitable matching algorithm may be employed in some embodiments of 415. According to some examples, an acceptable "similarity" distance between certain metric values of the records is specified (e.g., if the current entity data record contains number of years in business=20, match clusters where number of years is +/−5 of 20 (i.e., 15–25). An ordering of categorical values may also be specified (e.g., SIC code 1731 (electrical work) is closer to 1799 (special trade contractors) than 1741 (masonry and other stonework). Moreover, the matching algorithm may specify acceptable thresholds for appetite (e.g., T & A, but not L & N) and Catastrophic/Terrorism threat levels.

A current entity representative record is created at 420 based on the matched cluster. As noted above, a cluster may be represented by it's weighted midpoint across all its dimensions. Accordingly, the value of each field of the current entity representative record may equal the weighted midpoint of that field (i.e., dimension) in the matched cluster. FIG. 8 is a tabular representation of current entity representative record 800 according to the present example. As shown, the field values of the current entity representative record 800 are not identical to the field values of the current entity data 600 of FIG. 6, although record 800 and data 600 are both associated with the current entity.

A plurality of insurance coverage packages are determined at 425. Each of the determined insurance coverage packages may include one or more insurance coverages. According to some embodiments, 425 begins by identifying customer accounts associated with previously-issued insurance coverages. Data representing these accounts may be stored in data warehouse 120 and/or any other suitable enterprise storage systems.

Each customer account is associated with one or more issued insurance coverage packages, each of which includes one or more insurance coverages. Data is collected for each customer account including issued insurance coverages per package and premium per insurance coverage, SIC code, business insurance score, issue rate, number of employees, number of locations, number of buildings, etc.

The insurance coverages of each issued package are translated into a string of codes (e.g., 0071-0134-0180) for each customer account, resulting in one or more coverage code strings per customer account. The coverage code strings are ordered lexicographically so that, with reference to the above example, code 0071 will always appear before code 0134 if an issued package includes both corresponding coverages.

Next, a number of unique instances of each coverage code string is determined. The coverage code strings may initially be filtered based on a market segment of interest (e.g., defined by SIC code, region, number of employees, and/or any other data). That is, the determination of the number of unique instances may consider only those coverage strings associated with a customer account in a market segment of interest.

Figure 9:
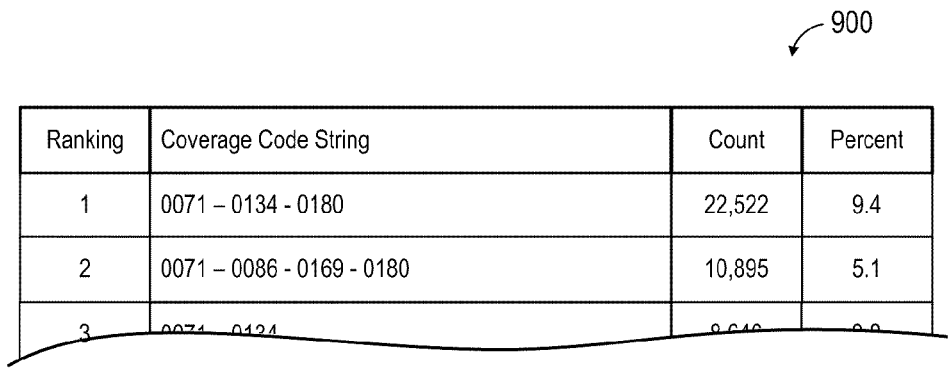
FIG. 9 illustrates the determination of insurance coverage packages according to some embodiments.

FIG. 9 shows analysis result 900 according to the foregoing example. Each coverage code string of analysis result 900 represents an insurance coverage package including one or more insurance coverages. The plurality of packages may be determined at 425 from the coverage code strings of analysis result 900. For example, analysis result 900 ranks the coverage code strings according to their number of unique instances. The top three coverage code strings may be used to determine three packages at 425, with each package including the insurance coverages specified by the coverage codes of one of the three coverage code strings.

Clusters of historical entities associated with each of the plurality of packages are created at 430. Accordingly, for each one of the plurality of insurance coverage packages determined at 425, historical entity data is reviewed to identify historical entities to whom the insurance coverage package was issued. Historical entity data records for each of the identified historical entities are used to create clusters for each of the plurality of insurance coverage packages as described above with respect to 410.

Figure 10:
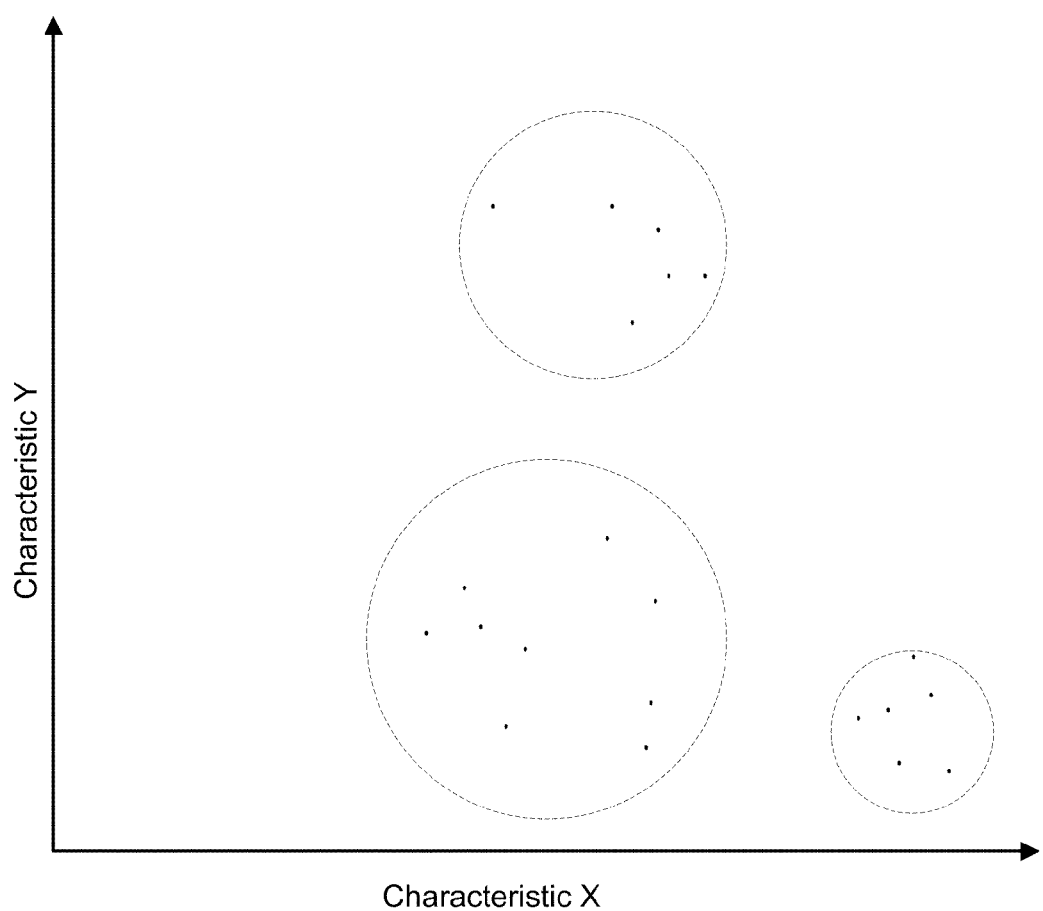
FIG. 10 is a simplified representation of clusters of historical entity data corresponding to insurance coverage packages according to some embodiments.

FIG. 10 represents clusters of the historical entity data records associated with one insurance coverage package according to some embodiments. FIG. 10 shows only two dimensions, but the historical entity data records are clustered across many dimensions as described above. Similar clusters are created for each other insurance coverage package determined at 425.

A representative record is created at 435 for each cluster of historical entities associated with each of the plurality of determined insurance coverage packages. The record may include a coverage string field representing an insurance coverage package and fields representing the weighted midpoint of each dimension of a cluster of historical entities who hold the insurance coverage package. With reference to the example of FIG. 10, three representative records would be created, with each record having a same coverage string field and with the contents of the other fields specifying the weighted midpoints of each dimension of one of the particular three clusters.

FIG. 11 provides an example of representative records 1100 created according to some embodiments of 435. Each record of records 1100 is associated with an insurance coverage package specified by its Coverage Code String field. The remaining fields describe a representative historical entity to which the insurance coverage package was issued. As mentioned above, multiple records of representative records 1100 may be associated with a same insurance coverage package, since several clusters of historical entity data may have been created for that insurance coverage package at 430.

Next, at 440, the current entity representative record created at 420 is matched to one or more of the representative records created at 435. The matching may proceed as described at 415 or using any other suitable algorithm for determining a match between multi-dimensional data records.

One or more packages are determined at 445 based on the matched representative records. For example, it may be determined at 440 that the current entity representative record matches representative records 1110 and 1120 of FIG. 11. These representative records are associated with coverage code strings "0071-0134-0180" and "0071-0086-0169-0180", respectively. Accordingly, a first package is determined at 445 including three insurance coverages corresponding to the coverage codes "0071-0134-0180", and a second package is determined including four insurance coverages corresponding to the coverage codes "0071-0086-0169-0180".

Figure 12:
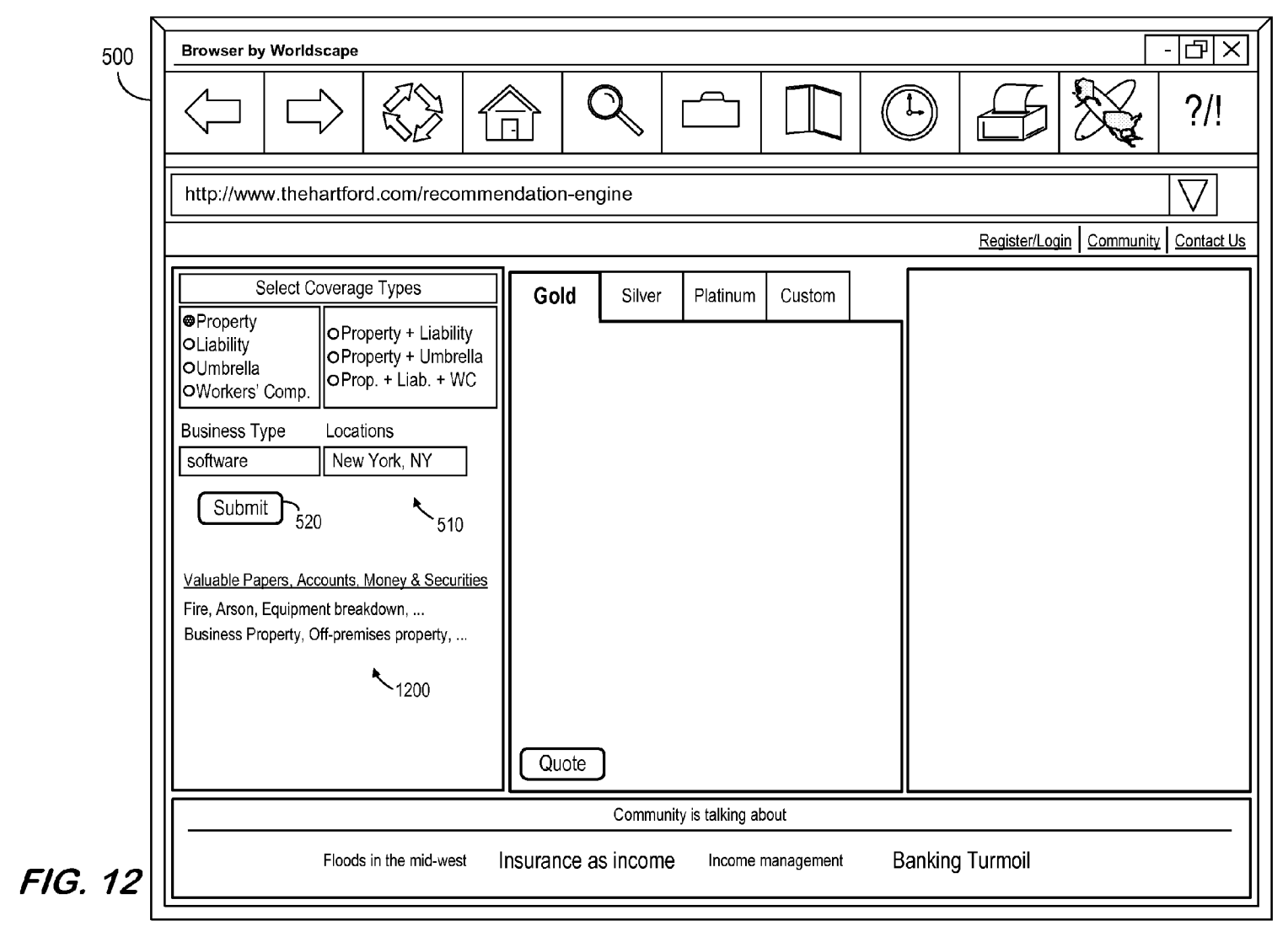

The determined packages are presented at 450. FIG. 12 shows interface 500 updated to present packages 1200 according to some embodiments. FIG. 12 shows three determined packages, each including more than one insurance coverage. The order in which the packages are presented may be based on a similarity of their corresponding historical representative record to the current entity representative record, a total potential premium of their constituent coverages, and/or on other suitable factors.

Embodiments of the foregoing may therefore provide efficient recommendation of appropriate insurance coverage packages for a given entity.

Figure 13:
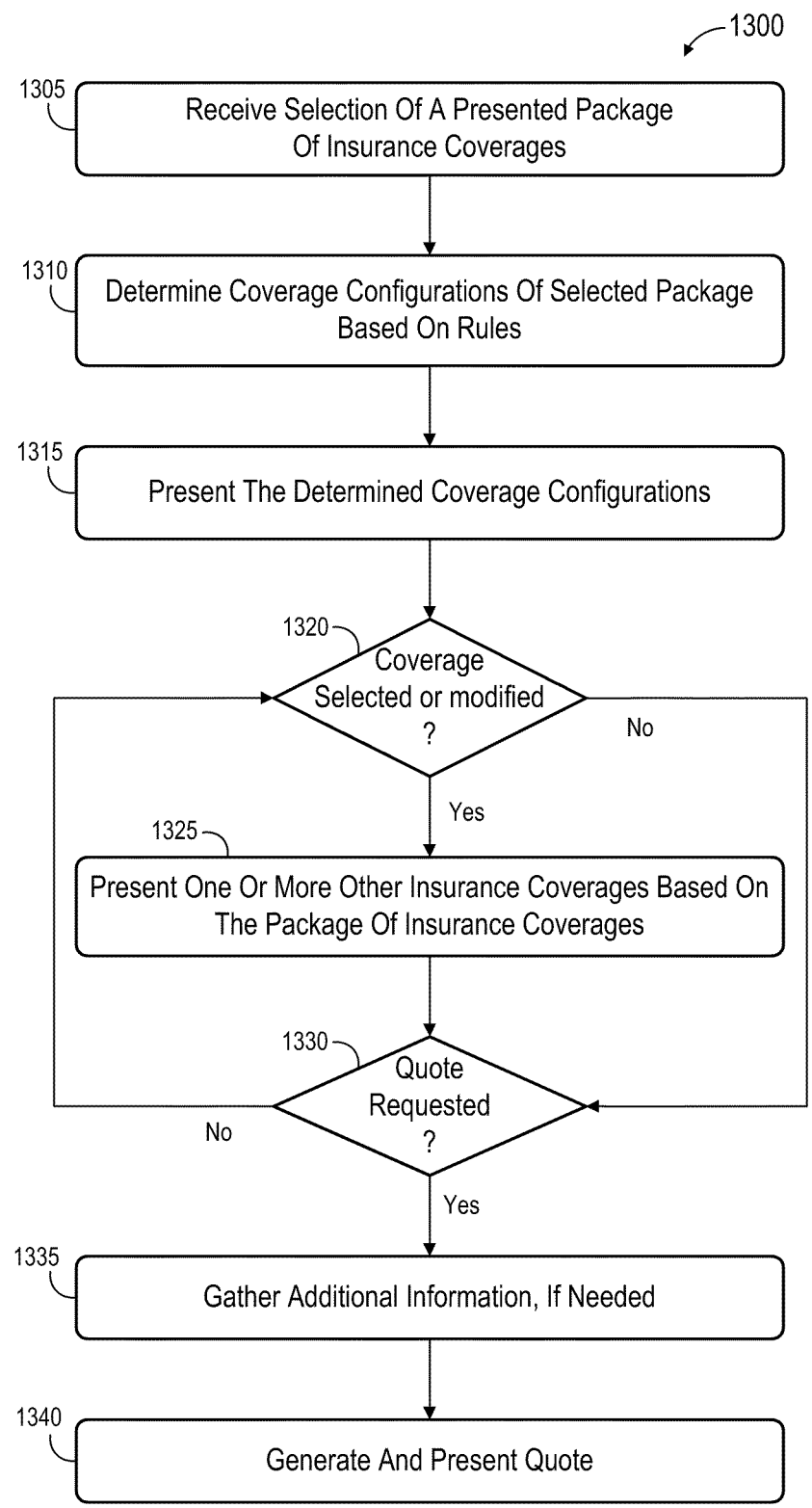
FIG. 13 is a flow diagram of a process according to some embodiments.

FIG. 13 is a flow diagram of process 1300 to present insurance coverage recommendations according to some embodiments. Various elements of system architecture 100 and/or computer system 200 may execute process 1300 according to some embodiments. Process 1300 may be embodied within program instructions of recommendation engine 210 of computer system 200, but embodiments are not limited thereto.

Initially, at 1305, a selection of a presented package of insurance coverages is received. Continuing with the above example, a user may operate interface 500 to select one of presented packages 1200. In this regard, process 1300 may proceed directly after process 400 in some embodiments.

Coverage configurations of the selected package are determined at 1310 based on configuration rules. A coverage configuration specifies limits and deductibles for the insurance coverages within a package. According to some embodiments, configuration rules such as configuration rules 213 may take the insurance coverages of the selected package as input and create multiple coverage configurations at 1310 using rules such as:

1) If the coverages of the selected package do not contain "stretches" (i.e., added coverage limits and coverage), designate the selected package as the basic configuration (e.g., silver), but add two more configurations (e.g., gold, platinum) by adding basic stretch and super-stretch, respectively, for the SIC code of the matching representative record;

2) If the coverages of the selected package contain stretch, add umbrella coverage and any additional lines of business coverage (e.g., selected package includes property and general liability coverages, add workers compensation and commercial auto coverages); and 3) If the user selected coverage string contains coverages from all lines of business and umbrella coverage, then create three configurations respectively associated with low, medium, and high limits and low, medium, and high deductibles.

Figure 14:
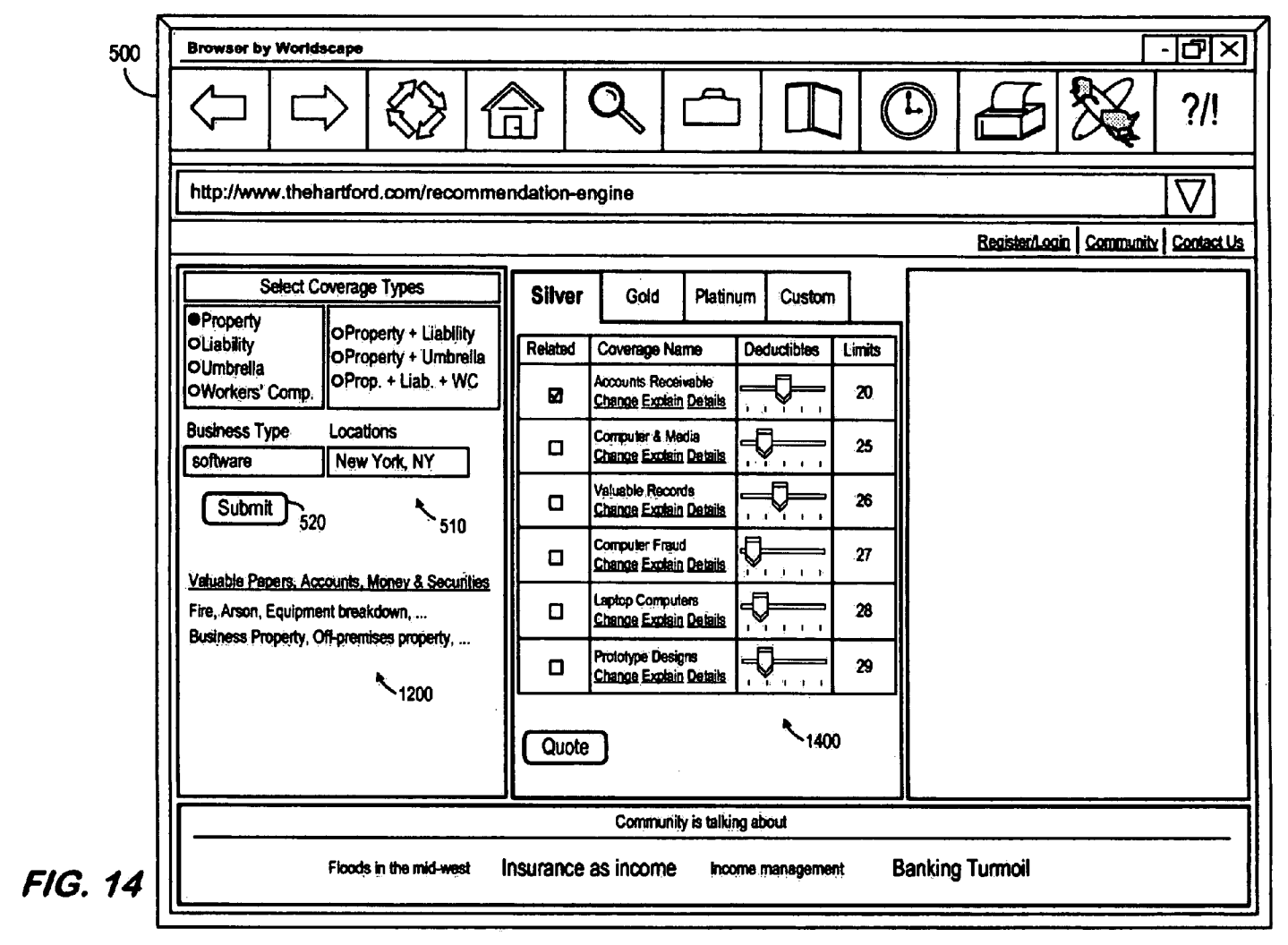

The determined coverage configurations are presented at 1315. FIG. 14 illustrates user interface 500 with area 1400 to present Silver, Gold and Platinum coverage configurations. As shown, the user may manipulate elements of area 1400 to select a coverage or modify a coverage (i.e., change limits and deductibles). Such a manipulation is detected at 1320, and triggers the presentation of one or more other insurance coverages at 1325.

The one or more other insurance coverages are presented based on the selected insurance coverage package. The one or more other insurance coverages may be presented as further coverage recommendations, and may be identified based on historical data. According to some embodiments, Market Basket Analysis is used at 1325 to identify one or more other insurance coverages that have been bought along with the selected coverages.

Generally, Market Basket Analysis refers to the identification of items that occur together in a given event or record. The output of Market Basket Analysis is a set of discovery rules based on frequency counts of the number of times items occur alone and in combination in historical data. The rules indicate an association between two or more items.

Market basket rules may provide four useful metrics for the identification of other insurance coverages at 1325: Confidence factor; Level of support; Lift; Expected confidence. Confidence factor equals the percentage of cases in which a consequent appears given that the antecedent has occurred, and defines the strength of an association between the consequent and the antecedent. Level of support indicates how frequently the combination occurs in the market basket (i.e., the historical data). Expected confidence is equal to the number of consequent transactions divided by the total number of transactions. Lift is equal to the confidence factor divided by the expected confidence. Lift is a factor by which the likelihood of consequent increases given an antecedent.

FIG. 15 is a tabular representation of data for providing an example of Market Basket Analysis used in some embodiments of 1325. According to the example, if a user selects coverage "BPP without wind exclusion" through area 1400 of interface 500 (e.g., to learn about the coverage or to adjust its limits or deductibles), a recommendation rule based on the FIG. 15 data will identify insurance coverage 73 and insurance coverage 70 at 1325. The recommendation rules can be implemented as rules (e.g., recommendation rules 214 of system 200) run in a rule engine or as condition statements in any standard programming language.

Figure 16:
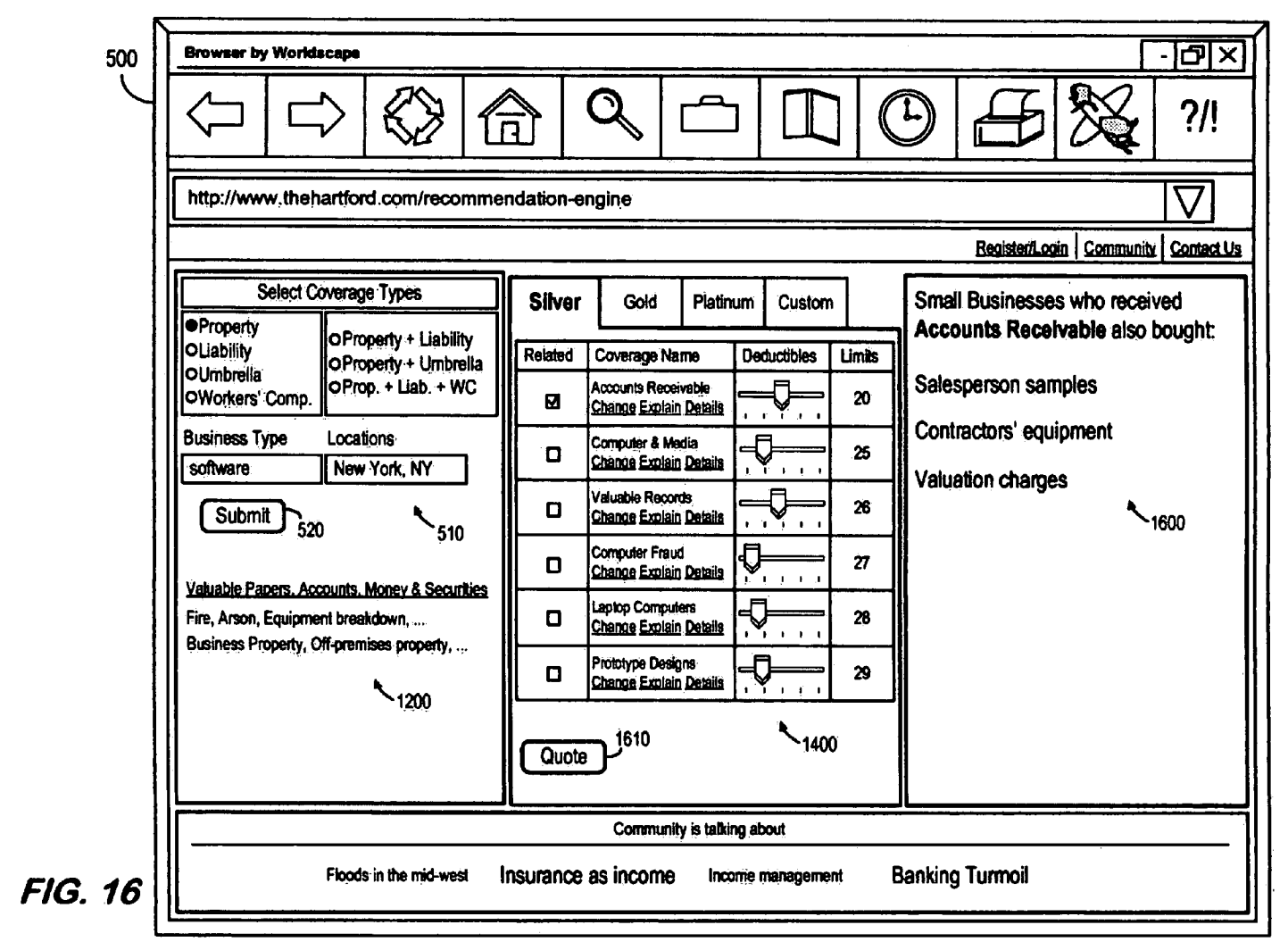

FIG. 16 illustrates area 1600 of interface 500 for presenting the one or more other insurance coverages at 1325. According to some embodiments, the presentation of the coverages in area 1600 (e.g, listing order, font size) is based on their respective Levels of support.

At 1330, it is determined whether a quote has been requested for the configuration shown in area 1400. If the user has not selected Quote button 1610, flow returns to 1320 to allow the user to change or modify a displayed coverage. Flow continues as described above to present other insurance coverages in area 1600 in response to user modification of area 1400 until Quote button 1610 is selected.

Once quote button 1610 is selected, any additional information needed to generate the quote is gathered at 1335. Gathering the needed information, if any, may comprise querying the user via subsequent Web pages, telephoning the user, accessing third party data, etc. Thereafter, at 1340, a quote is generated and presented to the user. The quote may be generated automatically or may require intervention of an underwriter or other personnel.

According to some embodiments, the user may also be presented with other policy-related benefits and services once a configuration is selected for quoting. These items may include rewards, discounts, billing options, etc., and their presentation may be based on the particular selected configuration.

Figure 17:
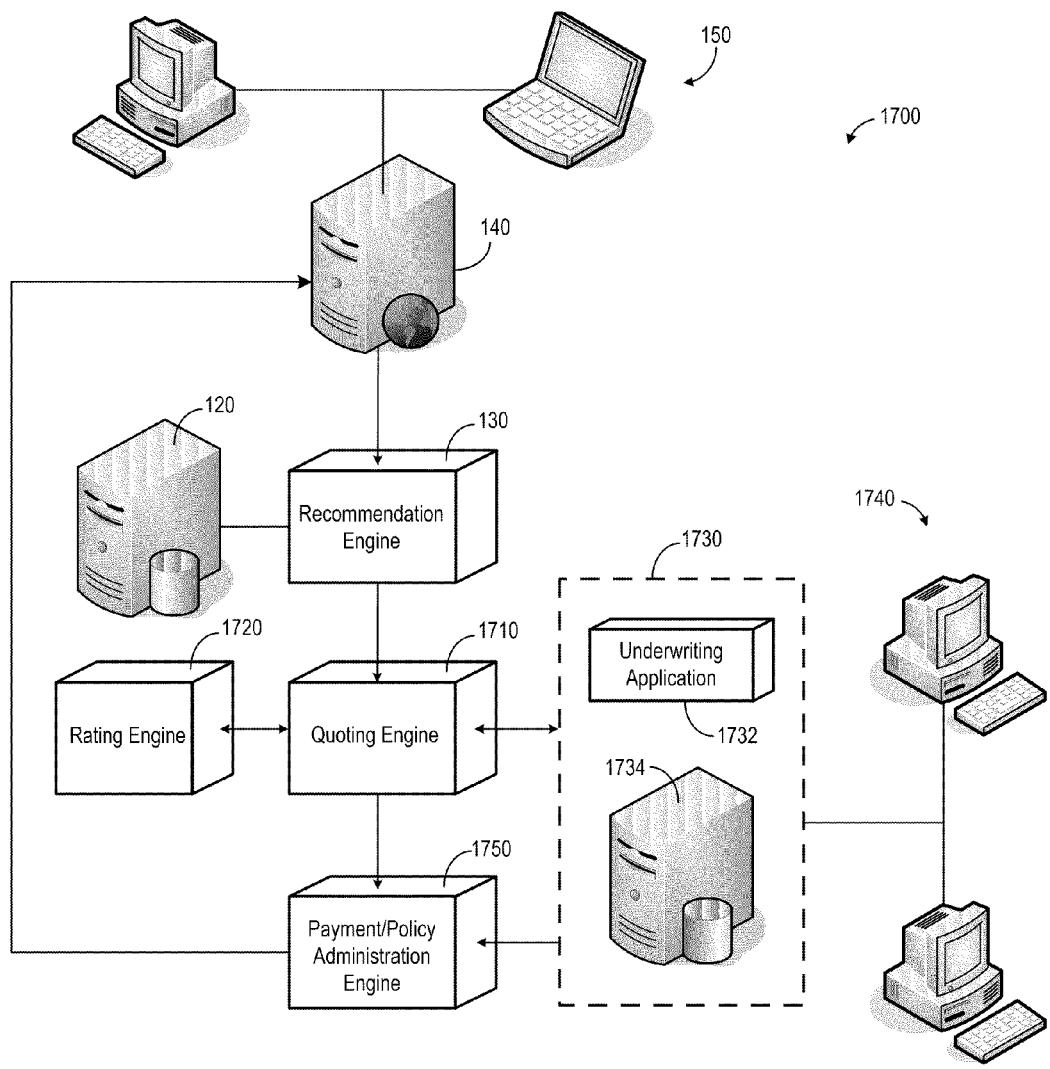
FIG. 17 illustrates a system architecture to provide a coverage recommendation, quote and policy according to some embodiments.

FIG. 17 is a diagram illustrating system architecture 1700 to provide a quote and a policy according to some embodiments. Each element of architecture 1700 may be implemented using one or more hardware devices, and two or more elements may be implemented using a single hardware device. Architecture 1700 includes data warehouse 120, recommendation 130, Web server 140 and requester terminals 150, each of which may perform functions such as those attributed thereto in the above description.

According to some embodiments, recommendation engine 130 transmits an indication to quoting engine 1710 once quote button 1610 of FIG. 1600 is selected. The indication may include an insurance configuration that was selected (and perhaps modified) by a requester operating one of terminals 150 as described above. Quoting engine 1710 transmits information relating to the selected configuration and the entity to be insured to rating engine 1720 and receives rating information in return according to known protocols.

Quoting engine 1710 thereafter transmits underwriting information to underwriting server 1730. Underwriting server 1730 includes underwriting application 1732 and underwriting database 1734. Underwriter terminals 1740 may be operated by underwriting personnel to perform underwriting tasks based on the underwriting information and using underwriting application 1730 and database 1734. As mentioned above, underwriting tasks may include acquisition of additional information that may be helpful in performing the underwriting tasks.

Underwriting server 1730 may transmit the results of the underwriting tasks to quoting engine 1710 and/or to payment/policy administration engine 1750. Based on the results, rating engine 1720 (and/or quoting engine 1710) formulates a quote (e.g., according to known processes) and transmits the quote to the user via Web server 140 or another communication mode (e.g., another Web server, electronic mail, post, etc.). Once the user indicates acceptance of the quote, payment/policy administration engine 1750 issues one or more corresponding policies.

In addition to the quote, the user may also receive forms for establishing a contract for the selected configuration as well as for processing premium payments. Accordingly, payment/policy administration engine 1750 may also debit a bank account of the insured entity's and issue policy forms to the insured entity. Processing the payment is intended to establish an insurance contract with the entity based on the selected configuration.

It should be noted that any of quoting engine 1710, rating engine 1720, underwriting engine 1730 and payment/policy administration engine 1750 may be in direct communication with recommendation engine 130, data warehouse 120, or any other system for accessing data, rules, forms, etc. needed to perform their respective tasks.

The embodiments described herein are solely for the purpose of illustration. Those in the art will recognize that other embodiments may be practiced with modifications and alterations limited only by the claims.

What is claimed is:

1. A computer system for providing a recommendation of at least one insurance coverage package for a current entity from among a plurality of commercial insurance coverages, the system comprising:
    a data storage device configured to receive, store, and provide access to historical entity data and insurance coverage package data;
    a computer processor configured to execute program instructions and retrieve the historical entity data and the insurance coverage package data from the data storage device;
    a memory, coupled to the computer processor, configured to store program instructions for execution by the computer processor;
    a recommendation engine comprising the program instructions stored in the memory;
    the program instructions that when executed by the computer processor, cause the computer processor to perform the steps of:
        receiving current entity data,
        creating, using a clustering system, a first plurality of historical entity data clusters, wherein each of the first plurality of historical entity data clusters includes a plurality of historical entity data records,
        matching the current entity data to a first cluster of the first plurality of historical entity data clusters,
        creating a current entity representative record based on the first cluster, wherein the current entity representative record is different from the current entity data,
        creating, using the clustering system, a second plurality of historical entity data clusters for each of a plurality of insurance coverage packages, wherein the creating of the second plurality of data clusters for each of the plurality of insurance coverage packages employs data of historical entities to which an insurance coverage package was issued,
        creating, for each of the second plurality of historical entity data clusters, a historical entity representative record,
        matching the current entity representative record to one or more of the historical entity representative records, and
        identifying one or more of the plurality of insurance coverage packages associated with the matched historical entity representative records;
    a communication device, coupled to the computer processor, configured to present the identified one or more of the plurality of insurance coverage packages; and
    a payment device configured to process a payment associated with one of the presented one or more of the plurality of insurance coverage packages, wherein processing the payment establishes an insurance contract with the current entity based on the one of the presented one or more of the plurality of insurance coverage packages.

2. The computer system according to claim 1, wherein creating the current entity representative record based on the first cluster comprises:
    creating the current entity representative record based on characteristic midpoints of the first cluster.

3. The computer system according to claim 2, wherein creating the one or more historical entity representative records for each of the plurality of insurance coverage packages comprises:
    for each of the plurality of insurance coverage packages, creating a historical entity representative record for each cluster of historical entity data associated with the insurance coverage package based on characteristic midpoints of each cluster.

4. The computer system according to claim 1, the recommendation engine further configured to:
    receive a selection of one of the presented insurance coverage packages;
    determine a plurality of coverage configurations of the selected insurance coverage package; and
    present the plurality of coverage configurations of the selected insurance coverage package.

5. The computer system according to claim 4, the recommendation engine further configured to:
   identify one or more other insurance coverages based on the insurance coverages of the selected insurance coverage package and based on a market basket analysis; and
   present the identified one or more other insurance coverages as recommended insurance coverages.

6. The computer system according to claim 1, the recommendation engine further configured to:
   receive a selection of one of the presented insurance coverage packages;
   identify one or more other insurance coverages based on the insurance coverages of the selected insurance coverage package and based on a market basket analysis; and
   present the identified one or more other insurance coverages as recommended insurance coverages.

7. The computer system according to claim 1, wherein the current entity data comprises data received from a third party, proprietary data, and data received from the current entity.

8. The computer system according to claim 7, wherein the historical entity data comprises data received from a third party, proprietary data, and data received from the historical entities.

9. The computer system according to claim 1, the recommendation engine further configured to:
   receive a selection of a modified one of the presented insurance coverage packages, the modified one of the presented insurance coverage packages including a modified limit or a modified deductible of one of the presented insurance coverage packages;
   determine a plurality of coverage configurations of the selected modified one of the insurance coverage packages; and
   present the plurality of coverage configurations of the modified one of the selected insurance coverage packages.

10. The computer system according to claim 1, further comprising:
    a requestor device configured to:
       provide the current entity data;
       receive the identified one or more of the plurality of insurance coverage packages; and
       indicate a selection of one of the identified one or more of the plurality of insurance coverage packages to the recommendation engine.

11. A computer implemented method for providing a recommendation of at least one insurance coverage package for a current entity from among a plurality of commercial insurance coverages, the method comprising:
    receiving current entity data by a computer system comprising a recommendation engine;
    creating, using a clustering system, a first plurality of historical entity data clusters, wherein each of the first plurality of historical entity data clusters includes a plurality of historical entity data records;
    matching, by a computer processor, the current entity data to a first cluster of the first plurality of historical entity data clusters;
    creating, in a data storage device of the computer system, a current entity representative record based on the first cluster, wherein the current entity representative record is different from the current entity data;
    creating, in the data storage device of the computer system using the clustering system, a second plurality of historical entity data clusters for each of a plurality of insurance coverage packages in the data storage device of the computer system, wherein the creating of the second plurality of data clusters for each of the plurality of insurance coverage packages employs data of historical entities to which an insurance coverage package was issued;
    creating, in the data storage device of the computer system, for each of the second plurality of historical entity data clusters, a historical entity representative record;
    matching the current entity representative record to one or more of the historical entity representative records of the data storage device;
    identifying one or more of the plurality of insurance coverage packages of the data storage device associated with the matched historical entity representative records;
    presenting the identified one or more of the plurality of insurance coverage packages to a user device; and
    processing a payment associated with the presented one or more of the plurality of insurance coverage packages, wherein processing the payment establishes an insurance contract with the current entity based on the one of the presented one or more of the plurality of insurance coverage packages.

12. The method according to claim 11, wherein creating the current entity representative record based on the first cluster comprises:
    creating the current entity representative record in the data storage device of the computer system based on characteristic midpoints of the first cluster.

13. The method according to claim 12, wherein creating the one or more historical entity representative records for each of the plurality of insurance coverage packages comprises:
    for each of the plurality of insurance coverage packages, creating in the data storage device of the computer system a historical entity representative record for each cluster of historical entity data associated with the insurance coverage package based on characteristic midpoints of each cluster.

14. The method according to claim 11, further comprising:
    receiving a selection of one of the presented insurance coverage packages from the user device;
    determining a plurality of coverage configurations of the selected insurance coverage package; and
    presenting the plurality of coverage configurations of the selected insurance coverage package to the user device.

15. The method according to claim 14, further comprising:
    identifying one or more other insurance coverages based on the insurance coverages of the selected insurance coverage package and based on a market basket analysis; and
    presenting the identified one or more other insurance coverages to the user device as recommended insurance coverages.

16. The method according to claim 11, further comprising:
    receiving a selection of one of the presented insurance coverage packages from the user device;
    identifying one or more other insurance coverages based on the insurance coverages of the selected insurance coverage package and based on a market basket analysis; and
    presenting the identified one or more other insurance coverages to the user device as recommended insurance coverages.

17. The method according to claim 11, wherein the current entity data comprises data received from a third party, proprietary data, and data received from the current entity.

18. The method according to claim 17, wherein the historical entity data comprises data received from a third party, proprietary data, and data received from the historical entities.

19. The method according to claim 11, further comprising:
receiving a selection of a modified one of the presented insurance coverage packages, the modified one of the presented insurance coverage packages including a modified limit or a modified deductible of one of the presented insurance coverage packages;
determining a plurality of coverage configurations of the selected modified one of the insurance coverage packages; and
presenting the plurality of coverage configurations of the modified one of the selected insurance coverage packages.

20. A computer system for providing a recommendation of at least one insurance coverage package for a current entity from among a plurality of commercial insurance coverages, the system comprising:
a data warehouse device configured to store insurance coverage package data and historical insured entity data;
a requestor device;
a recommendation engine comprising:
a computer processor configured to execute program instructions and retrieve the historical insured entity data and the insurance coverage package data from the data warehouse device;
a memory, coupled to the computer processor, configured to store program instructions that when executed by the computer processor, cause the computer processor to perform the steps of:
receiving current entity data from the requestor device,
creating, using a clustering system, a first plurality of historical entity data clusters, wherein each of the first plurality of historical entity data clusters includes a plurality of historical entity data records,
matching the current entity data to a first cluster of the first plurality of historical entity data clusters,
creating a current entity representative record based on the first cluster, wherein the current entity representative record is different from the current entity data,
creating, using the clustering system, a second plurality of historical entity data clusters for each of a plurality of insurance coverage packages, wherein the creating of the second plurality of data clusters for each of the plurality of insurance coverage packages employs data of historical entities to which an insurance coverage package was issued,
creating, for each of the second plurality of historical entity data clusters, a historical entity representative record,
matching the current entity representative record to one or more of the historical entity representative records,
identifying one or more of the plurality of insurance coverage packages associated with the matched historical entity representative records,
presenting the identified one or more of the plurality of insurance coverage packages to the requestor device, and
receiving a selection of one of the presented one or more insurance coverage packages from the requestor device; and
an insurance quoting device configured to generate a quote based on the selected one of the presented one or more insurance coverage packages.

21. The computer system according to claim 20, wherein creating the current entity representative record based on the first cluster comprises:
creating the current entity representative record based on characteristic midpoints of the first cluster.

22. The computer system according to claim 21, wherein creating the one or more historical entity representative records for each of the plurality of insurance coverage packages comprises:
for each of the plurality of insurance coverage packages, creating a historical entity representative record for each cluster of historical entity data associated with the insurance coverage package based on characteristic midpoints of each cluster.

23. The computer system according to claim 20, further comprising:
a payment engine device configured to process a payment associated with the selected one of the presented one or more insurance coverage packages, wherein the payment establishes an insurance contract with the current entity based on the selected one of the presented one or more insurance coverage packages.

24. The computer system according to claim 20, wherein the memory is further configured to store program instructions that when executed by the computer processor, cause the computer processor to perform the steps of:
receiving a selection of a modified one of the presented insurance coverage packages, the modified one of the presented insurance coverage packages including a modified limit or a modified deductible of one of the presented insurance coverage packages;
determining a plurality of coverage configurations of the selected modified one of the presented insurance coverage packages; and
presenting the plurality of coverage configurations of the selected modified one of the presented insurance coverage packages.

* * * * *